US009508972B2

United States Patent
Koch et al.

(10) Patent No.: US 9,508,972 B2
(45) Date of Patent: Nov. 29, 2016

(54) VENTING DEVICE FOR AN ELECTROCHEMICAL BATTERY AND BATTERY WITH A VENTING DEVICE

(75) Inventors: Ingo Koch, Hameln (DE); Peter Streuer, Hannover (DE); Armin Staffeldt, Lauenbrück (DE); Doreen Lucht, Franklin, WI (US); Jerome Heiman, Campbellsport, WI (US); Donald Caldwell, Milwaukee, WI (US); Dirk Bremer, Neustadt (DE)

(73) Assignees: Johnson Controls Technology Company, Plymouth, MN (US); Johnson Controls Autobatterie GmbH & Co. KGAA (DE)

( * ) Notice: Subject to any disclaimer, the term of this patent is extended or adjusted under 35 U.S.C. 154(b) by 221 days.

(21) Appl. No.: 14/382,207

(22) PCT Filed: Mar. 2, 2012

(86) PCT No.: PCT/IB2012/000532
§ 371 (c)(1),
(2), (4) Date: Aug. 29, 2014

(87) PCT Pub. No.: WO2013/128226
PCT Pub. Date: Sep. 6, 2013

(65) Prior Publication Data
US 2015/0044530 A1    Feb. 12, 2015

(51) Int. Cl.
*H01M 2/12* (2006.01)
(52) U.S. Cl.
CPC .......... *H01M 2/127* (2013.01); *H01M 2/1252* (2013.01)
(58) Field of Classification Search
CPC .. H01M 2/12; H01M 2/1205; H01M 2/1223; H01M 2/1252; H01M 2/1264; H01M 2/127
See application file for complete search history.

(56) References Cited

U.S. PATENT DOCUMENTS

| 1,992,151 | A | * | 2/1935 | Woodbridge | H01M 2/1205 137/43 |
| 4,072,799 | A |  | 2/1978 | Leeson et al. | |
| 4,317,868 | A | * | 3/1982 | Spiegelberg | H01M 2/1205 429/82 |
| 5,030,526 | A | * | 7/1991 | Braswell | H01M 6/38 429/113 |
| 5,407,760 | A | * | 4/1995 | Kasner | H01M 2/1205 429/54 |
| 5,565,282 | A | * | 10/1996 | Feres | H01M 2/127 429/175 |

\* cited by examiner

FOREIGN PATENT DOCUMENTS

| DE | 29705725 U1 | 5/1997 |
| EP | 0189543 A2 | 8/1986 |

OTHER PUBLICATIONS

International Search Report and Written Opinion of the International Searching Authority dated Jul. 20, 2012, for Intl. Appln. No. PCT/IB2012/000532 filed Mar. 2, 2012.

*Primary Examiner* — Eli Mekhlin
(74) *Attorney, Agent, or Firm* — Boardman & Clark LLP

(57) ABSTRACT

The invention relates to a venting device (1) for an electrochemical battery (90). The venting device comprises at least one inlet opening (2) for receiving gases venting from the battery (90), at least one outlet opening (3) for venting the gases received from the battery (90), and at least one flame arrester element (4). The inlet opening (2) is in communication with the outlet opening (3) via the flame arrester element (4). An explosion chamber (5, 6) is located within the venting device (1) on the side of the flame arrester element (4) which is directed to the outlet opening (3). The explosion chamber (5, 6) is arranged for developing and temporarily storing an explosive mixture of the gases received from the battery (90) and oxygen from the ambient air, which explodes in case a flame occurs within the explosion chamber (5, 6), thereby blowing off the flame.

30 Claims, 7 Drawing Sheets

VENTING DEVICE FOR AN ELECTROCHEMICAL BATTERY AND BATTERY WITH A VENTING DEVICE

Figure 1:
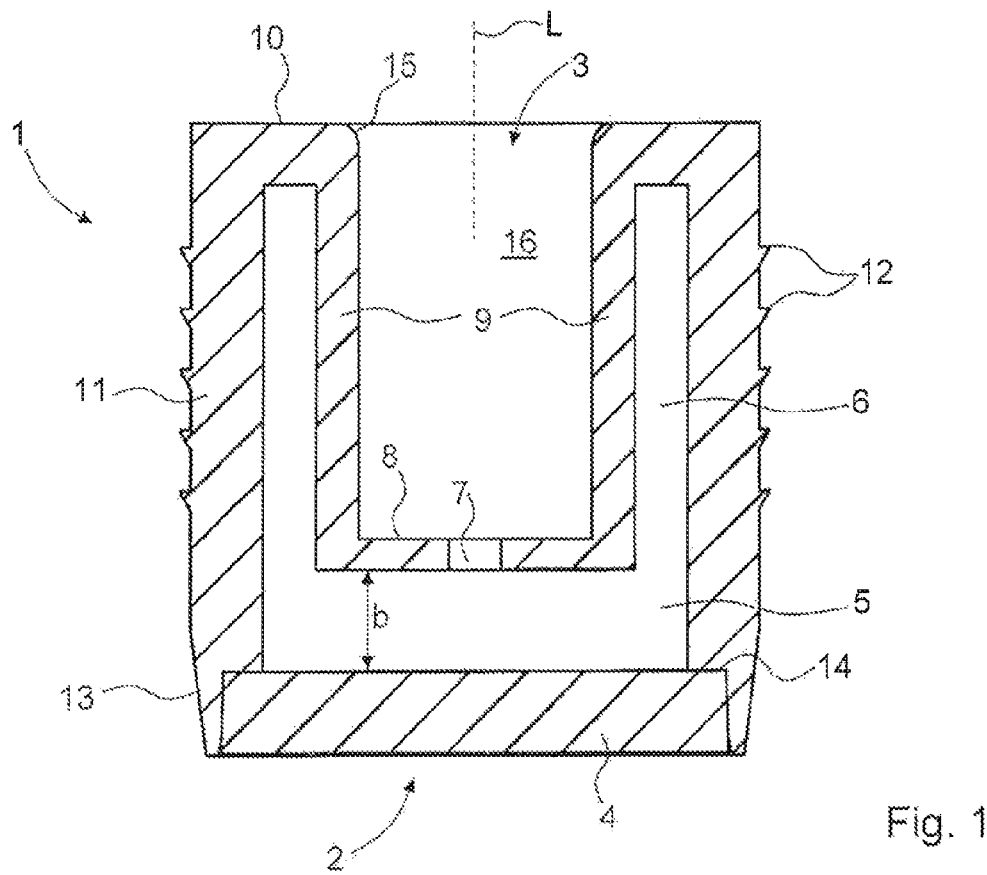

The invention relates to a venting device for an electrochemical battery as specified in claim 1. The invention further relates to a battery with such a venting device as specified in claim 27.

Electrochemical batteries typically require an outlet opening for venting the gases which are generated inside the battery due to electrochemical reactions during charging and discharging of the battery. It is already known, e.g. from DE 297 05 725 U1 to equip an electrochemical battery with a venting device comprising a flame arrester element. The flame arrester has an outer side facing the outside of the battery and an inner side facing the inside of the battery. The flame arrester element prevents a breakthrough of flames occurring on the outer side to the inside of the battery, thereby avoiding an ignition or explosion of the gases within the battery. One drawback of the known venting devices is that depending on the geometry of the venting device and the chemical composition of the emerging gases a flame occurring on the outer side could continue to burn for a certain time, thereby damaging the plastic material of the battery housing and the venting device in the proximity of the flame arrester element.

It is therefore an object of the invention to propose a venting device for an electrochemical battery which avoids the drawbacks of the prior art devices.

According to claim 1, a venting device for an electrochemical battery is proposed which comprises:
a) the venting device comprises at least one inlet opening for receiving gases venting from the battery, the inlet opening being arranged for connection to a degassing opening of the electrochemical battery,
b) the venting device comprises at least one outlet opening for venting the gases received from the battery, the outlet opening being directed to the ambience of the battery,
c) the venting device comprises at least one flame arrester element, the flame arrester element being arranged to prohibit a breakthrough of flames into the interior of the battery,
d) the inlet opening is in communication with the outlet opening via the flame arrester element,
e) an explosion chamber is located within the venting device on the side of the flame arrester element which is directed to the outlet opening,
f) the explosion chamber is arranged for developing and temporarily storing an explosive mixture of the gases received from the battery and oxygen from the ambient air, which explodes in case a flame occurs within the explosion chamber, thereby blowing off the flame.

Compared to known devices, the present invention suggests providing the venting device with an explosion chamber which intentionally allows for a limited explosion of the emerging gases and for using the explosion for blowing off any flame which had occurred. Among the known devices it was always tried to avoid any kind of explosion at all. The proposed venting device allows for an increased safety in use of electrochemical batteries of any kind with very little expenses. The proposed venting device is suited for batteries of the AGM type (AGM—Absorbent Glass Mat) as well as for conventional non-AGM batteries.

The venting device, in particular the wall surrounding the explosion chamber, can be made of plastic material, in particular any resin like thermoplasts. For example it can be made of polypropylene (PP).

According to an advantageous embodiment of the invention, the outlet opening is in communication with the explosion chamber via at least one first communication opening which is located within a wall surrounding the explosion chamber at least partially. This has the advantage that a defined passage can be provided between the explosion chamber and the outlet opening by means of the first communication opening, which can be dimensioned in an appropriate way for the specific battery, in such way that the outer dimensions of the venting device meet the dimensional specifications of the battery while the venting device further fulfils the required communication function for leaving the emerging gases through to the outlet opening. The first communication opening can be dimensioned independently from the outlet opening in such way that a defined amount of the ambient air could enter the explosion chamber in order to build up an explosive mixture in the explosion chamber with the gases emerging from the battery.

According to an advantageous embodiment of the invention, the first communication opening has a limited cross section which ensures that a flame occurring on the flame arrester element on the side of the explosion chamber is extinguished through the explosion within the explosion chamber. It has been found that a reduction of the cross section of the first communication opening, compared to the cross sections of outlet openings of known venting devices, has a positive effect on the extinction of the flames through the explosion. Through a certain dimensioning of the cross section of the first communication opening it can further be positively influenced that the mixture of gases which is built up within the explosion chamber is an explosive mixture. Therefore, through the first communication opening an adequate mixture of the gases between the oxygen from the ambient air and the gases from the inside of the battery can be forced. The exact dimension of the cross section of the first communication opening depends on the type of electrochemical battery, which influences the chemical composition of the gases emerging from the battery. The required limited cross section of the first communication opening can be found for any type of electrochemical battery with only few experiments. Exemplary values for typical lead acid batteries, both AGM and non-AGM types, are given below.

According to an advantageous embodiment of the invention, the distance between the wall in which the first communication opening is located and the flame arrester element is dimensioned such that a flame occurring on the flame arrester element within the explosion chamber is extinguished through the explosion within the explosion chamber. It has been found that another parameter for optimising the explosion function of the venting device is the distance between the wall in which the first communication opening is located and the flame arrester element. Compared with known venting devices, the proposed venting device comprises a larger distance between any wall facing the flame arrester element and the flame arrester element. This improves the flame extinguishing effect of the explosion with the explosion chamber. In addition, the explosion chamber is enlarged so that enough explosive mixture of the gases can be built up within the explosion chamber for safely blowing off any flame. As already mentioned with regard to the limited cross section of the first communication opening, in similar manner the optimum distance between the wall in which the first communication opening is located and the flame arrester element depends on the type of electrochemical battery. Examples for lead acid type batteries are given hereinafter.

According to an advantageous embodiment of the invention, the flame arrester element is or comprises an ignition protection frit made of flame retardant material. The flame retardant material can be, for example, any sintered resin or metal material, like polypropylene, brass or aluminium.

According to an advantageous embodiment of the invention, the explosion chamber comprises a first chamber section which is generally cylindrical, the first chamber section being located between the flame arrester element and the wall in which the first communication opening is located, and wherein the explosion chamber comprises a second chamber section which is ring-shaped, the second chamber section being located adjacent the first chamber section on the side of the first chamber section facing away from the flame arrester element. This has the advantage that the venting device can be of a compact design with small dimensions while providing for an enlarged volume of the explosion chamber. An open space within the ring-shaped second chamber section can be used for connection a venting hose to the venting device.

According to an advantageous embodiment of the invention, the first communication opening passes into an outer nozzle-like extension, the outer nozzle-like extension being located on the wall in which the first communication opening is located, but outside the explosion chamber. This has the advantage that the first communication opening is prolonged through the outer nozzle-like extension which comprises an internal channel. This further improves the flame extinguishing capabilities of the venting device through the explosion within the explosion chamber, since by the outer nozzle-like extension the flow of the ambient air into the explosion chamber can be regulated. Further, the outer nozzle-like extension can be used as a connection element for plugging on a venting hose.

According to an advantageous embodiment of the invention, the outer nozzle-like extension comprises one or more additional openings which are located within a sidewall of the outer nozzle-like extension. This has the advantage that the one or more additional openings are available for feeding ambient air into the explosion chamber. The one ore more additional openings can be located at any position within the sidewall of the outer nozzle-like extension. It is possible to locate one or more additional openings in the area where the outer nozzle-like extension merges with the wall in which the first communication opening is located. In this way, the additional openings can pass over into the first communication opening.

According to an advantageous embodiment of the invention, the outer nozzle-like extension extends into a hollow chamber of the venting device which is in communication with the ambience of the battery, wherein the outer nozzle-like extension forms a hose connector.

According to an advantageous embodiment of the invention, the first communication opening passes into an inner nozzle-like extension which is located on the wall in which the first communication opening is located, whereby the inner nozzle-like extension is located within the explosion chamber. This has the advantage that the first communication opening is prolonged through the inner nozzle-like extension which comprises an internal channel. This further improves the flame extinguishing capabilities of the venting device through the explosion within the explosion chamber, since by the inner nozzle-like extension the flow of the ambient air into the explosion chamber can be regulated.

According to an advantageous embodiment of the invention, the venting device comprises a sleeve of flame retardant material which surrounds the first communication opening and/or the inner nozzle-like extension. This has the advantage that the flame retardant material requires less space which allows for a more compact design of the venting device. The sleeve of flame retardant material can be embodied as the flame arrester element or can be provided in addition to a flame arrester element.

According to an advantageous embodiment of the invention, the venting device has a generally circular cross section, the explosion chamber has a generally circular cross section and is located concentrically within the venting device. This further improves the compact design of the venting device and allows for cost and material efficient production of the venting device.

According to an advantageous embodiment of the invention, the outlet opening is in communication with the explosion chamber via at least one first communication opening which is located within a wall surrounding the explosion chamber at least partially, the first communication opening being located concentrically within the explosion chamber. This further improves the compact design and the efficient manufacturing of the venting device.

According to an advantageous embodiment of the invention, the venting device comprises a receiving area for receiving the flame arrester element, the receiving area being composed of the wall material of the venting device, wherein the receiving area comprises a step or shoulder in which the flame arrester element can be inserted. This has the advantage that the flame arrester element can be inserted in an easy way into the venting device which provides for reduced production cost. Further, the flame arrester element can be easily fixed on the venting device, without requiring further mounting or fixture elements.

According to an advantageous embodiment of the invention, the first communication opening passes into the explosion chamber via at least one continuation channel which extends in a transversal or diagonal direction in relation to the longitudinal axis of the venting device. By such at least one continuation channel the flow of air from the ambience into the explosion chamber can be optimised and directed to desired positions within the explosion chamber. This allows for improvements when the explosive mixture of the gases is built up within the explosion chamber.

According to an advantageous embodiment of the invention the explosion chamber is in communication with the flame arrester element via a second communication opening, the cross section of the second communication opening being small compared to the cross section of the explosion chamber. For example, the cross section of the second communication opening can be at least 10 or 20 times smaller than the cross section of the explosion chamber. This has the advantage that the build-up of the explosive mixture of gases within the explosion chamber can be positively influenced by providing a defined passage for feeding the gases from the inside of the battery into the explosion chamber. The second communication opening provides for a further parameter which can be separately optimised in relation to the cross section of the first communication opening in order to ensure that the mixture of gases within the explosion chamber is sufficient explosive under the desired operating conditions of the battery.

According to an advantageous embodiment of the invention, the cross section of the first communication opening is small compared to the cross section of the explosion chamber. For example, the cross section of the first communication opening can be at least 10 or 20 times smaller than the cross section of the explosion chamber.

According to an advantageous embodiment of the invention, the first and/or the second communication opening comprises more than one separate opening or channel located side-by-side which are providing degassing channels in parallel. Through such parallel degassing channels the degassing behaviour of the battery can be optimised.

The venting device can be made as an integral part of the battery, for example as a part of the battery housing like the battery cover comprising a system of degassing channels. According to an advantageous embodiment of the invention, the venting device is a plug which is arranged to be plugged into the degassing opening of the electrochemical battery. This has the advantage that the venting device can be manufactured as a separate part, e.g. by a sub-supplier, and can be easily mounted within the electrochemical battery. The venting device can also be designed as a vent cap.

According to an advantageous embodiment of the invention, the flame arrester element is mounted on the housing material of the venting device wherein the explosion chamber is delimited by the housing material of the venting device and the flame arrester element.

According to an advantageous embodiment of the invention, the dimension of the explosion chamber in the longitudinal direction of the venting device is larger than the length of the first communication opening. The length of the first communication opening is defined by the thickness of the wall in which the first communication opening is located if there is no inner or outer nozzle-like extension. In case of any inner or outer nozzle-like extension the length of the first communication opening is measured between the opposite openings of the extensions or an extension and the first communication opening.

According to an advantageous embodiment of the invention, the dimension of the explosion chamber in the longitudinal direction of the venting device completely or partially overlaps with the longitudinal dimension of the first communication opening. This provides for a compact design of the venting device. The longitudinal dimension is measured along the longitudinal axis of the venting device.

According to an advantageous embodiment of the invention, the flame arrester element comprises a central clearance, the explosion chamber being located within the central clearance. This further positively affects the compact design of the venting device. The central clearance can be located exactly centrally within the flame arrester element or a bit eccentrically, but shall be surrounded by the material of the flame arrester element.

According to an advantageous embodiment of the invention, the cross section of the first communication opening divided by the distance between the wall in which the first communication opening is located and the flame arrester element is less than 12 mm, in particular less than 3 mm, in particular less than 0.6 mm.

According to an advantageous embodiment of the invention, the volume of the explosion chamber divided by the cross section of the first communication opening is larger than 200 mm, in particular larger than 500 mm, in particular larger than 1000 mm.

According to an advantageous embodiment of the invention, the volume of the explosion chamber divided by the distance between the wall in which the first communication opening is located and the flame arrester element is smaller than 2200 $mm^2$, in particular smaller than 1200 $mm^2$, in particular smaller than 600 $mm^2$.

Another advantageous embodiment of the invention is an electrochemical battery with a venting device according to any of the aforementioned embodiments.

The invention is further described by way of examples using the following figures.

Figure 5:
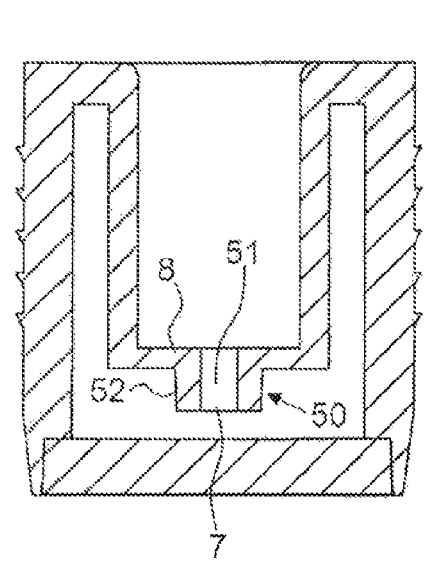
Figure 6:
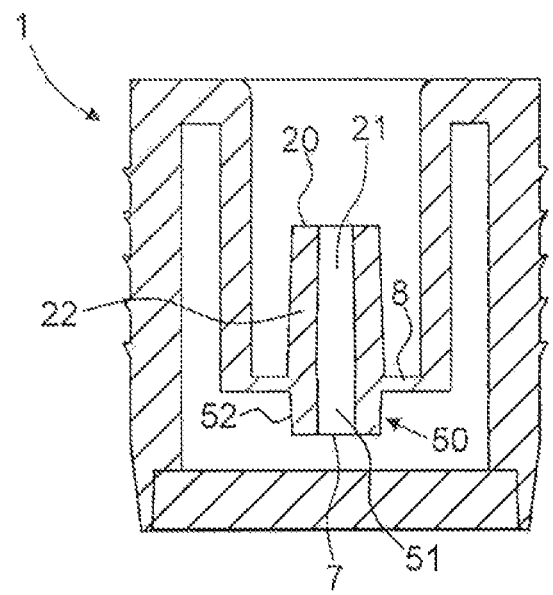
Figure 9:
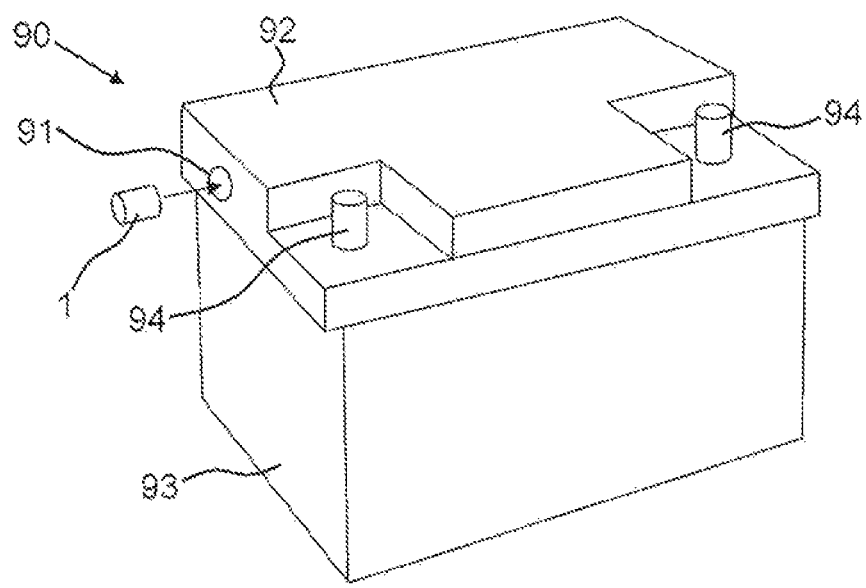
Figure 7:
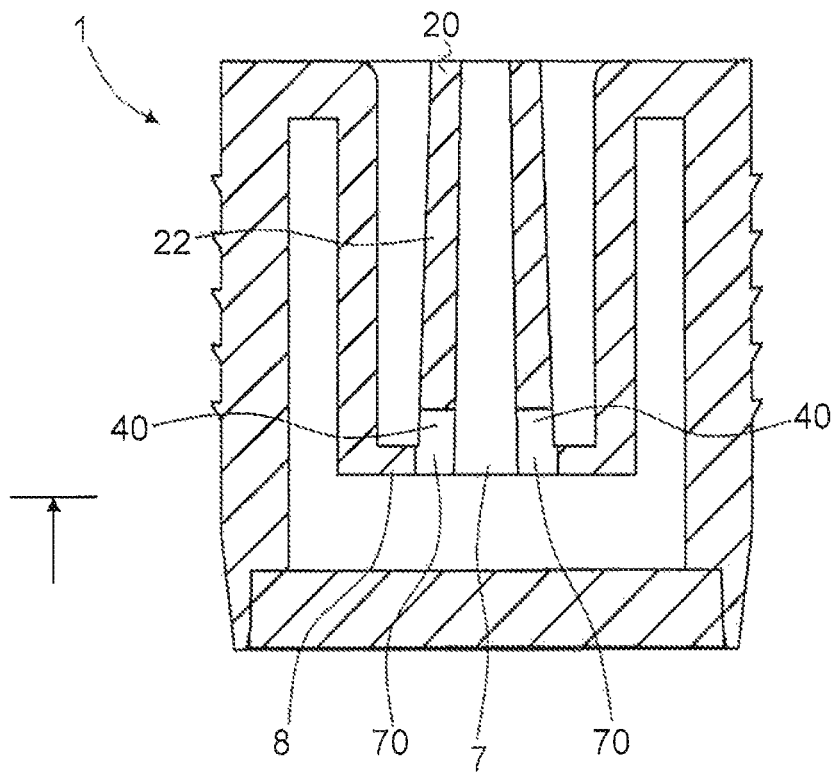
Figure 8:
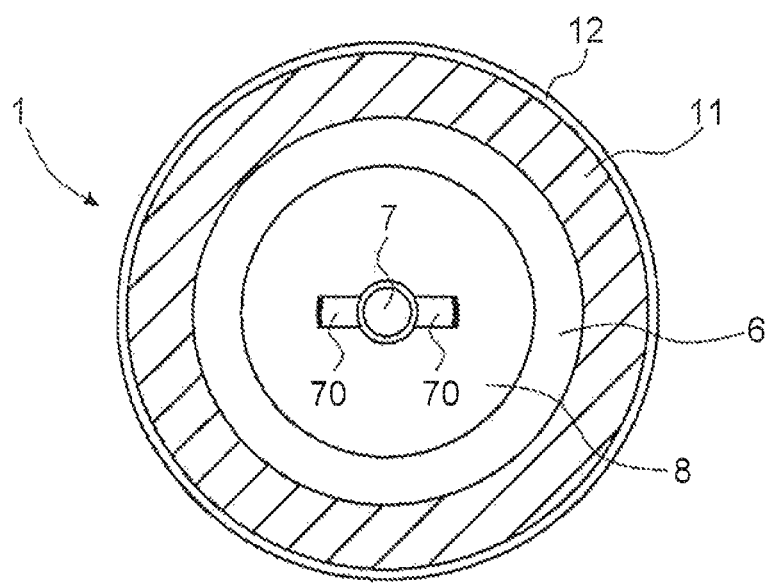

FIGS. 1 to 7—various embodiments of a venting device in a lateral sectional view and FIG. 8—the venting device of FIG. 7 in a sectional view from the bottom side and FIG. 9—an electrochemical battery with a venting device and FIGS. 10 to 15—various embodiments of a venting device in a lateral sectional view.

In the drawings same reference numerals are used for same elements. The drawings depict the embodiments of the venting device with varying scale which appears best suited for demonstrating the features of the various embodiments. The various embodiments can be carried out with dimensions adapted to the specific battery where the venting device shall be used. In such way the dimensions of such practical realisations can be different to the dimensions shown in the drawings. The embodiments shown in the drawings depict venting devices which are rotationally symmetrical which means that they have a circular cross section. The invention is not limited to such circular cross sections. Instead, any kind of outer or inner shape of the elements of the venting device can be realised like a square shape, a hexagonal shape or an oval shape.

FIG. 1 depicts a venting device 1 comprising a tubular outer wall 11, a tubular inner wall 9, a discoid upper wall 10 with a central opening and a discoid lower wall 8. The venting device 1 comprises an inlet opening 2 for receiving gases venting from an electrochemical battery. The venting device 1 further comprises an outlet opening 3 for venting the gases received from the battery. The outlet opening 3 is located on the opposite side (upper side of the venting device) from the side of the inlet opening 2 (lower side of the venting device). The outlet opening 3 forms the central opening in the discoid upper wall 10. The tubular outer wall 11 merges on the upper side of the venting device 1 into the discoid upper wall 10 which merges into the tubular inner wall 9. The tubular inner wall 9 merges into the discoid lower wall 8. The arrangement of the tubular outer wall 11, the discoid upper wall 10, the tubular inner wall 9 and the discoid lower wall 8 can be manufactured as a single moulded part, e.g. by injection moulding of plastic material.

The tubular outer wall 11 comprises on its inner side a step or shoulder 14 where a flame arrester element 4 of a disc-shaped form is inserted. In the interior of the venting device 1 an explosion chamber 5, 6 is located. The explosion chamber 5, 6 is surrounded by the tubular outer wall 11, the discoid upper wall 10, the tubular inner wall 9, the discoid lower wall 8 and the flame arrester element 4. The explosion chamber 5, 6 comprises a first chamber section 5 which is of a cylindrical shape. The first chamber section 5 is located between the flame arrester element 4 and the discoid lower wall 8. The explosion chamber 5, 6 comprises a second chamber section 6 which is ring-shaped and is located in the area between the tubular inner wall 9 and the tubular outer wall 11. The second chamber section 6 is located adjacent the first chamber section 5 on the side of the first chamber section 5 facing away from the flame arrester element 4.

In the interior space surrounded by the tubular inner wall 9 a hollow chamber 16 is located between the discoid lower wall 8 and the upper side of the venting device, merging into the outlet opening 3. The discoid lower wall 8 comprises a first communication opening 7. Through the first communication opening 7 the explosion chamber 5, 6 is in communication with the hollow chamber 16 and the outlet opening 3. Gases venting from the battery can pass through the flame arrester element after reaching the inlet opening 2 and can then pass through the explosion chamber 5, 6, the first communication opening 7, the hollow chamber 16 to the outlet opening 3 and are then released to the ambient atmosphere.

FIG. 1 further shows a central line L indicating the longitudinal axis of the venting device 1. Further, a distance b is shown as the distance between the flame arrester element 4 and the lower wall 8 which is in the embodiment depicted in FIG. 1 the same distance as the distance between the flame arrester element 4 and the first communication opening 7. For example, the venting device 1 can have a length, measured in the longitudinal direction along axis L, of 15.5 mm and an outer diameter of 14.5 mm. The distance b can be in the area of 1 to 4 mm, for example 2.5 mm. The diameter of the first communication opening 7, assuming a circular shape, can be in the area of 0.3 to 2.3 mm, for example 1.3 mm. The explosion chamber 5, 6 can have a volume in the area of 1,000 to 2,500 mm$^3$, for example 1,480 mm$^3$.

The outer wall 11 can be provided with a number of barbed extensions 12 on its circumference. The barbed extensions 12 can be ring-shaped surrounding the whole outer circumference of the outer wall 11. In the area where the flame arrester element 4 is located the outer wall 11 can be conical shaped on its outside, resulting in an outer conical 13 section of the outer wall 11. This eases the insertion of the venting device 1 into a venting opening of the electrochemical battery. The change-over area between the upper wall 10 and the inner wall 9 can be designed with a certain radius 15 which eases the insertion of a hose or tube into the hollow chamber 16.

In the description of the further figures only the differences to the embodiment of FIG. 1 are explained in detail. Other features are the same as explained for the embodiment of FIG. 1.

Figure 2:
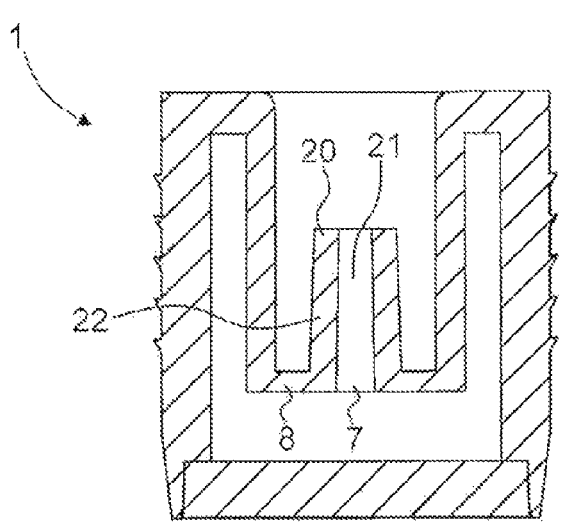

The embodiment of the venting device of FIG. 2 comprises an outer nozzle-like extension 20 extending into the hollow chamber 16 from the lower wall 8. The first communication opening 7 passes into the outer nozzle-like extension 20, in particular into an internal channel 21 of the outer nozzle-like extension 20. A sidewall 22 of the outer nozzle-like extension 20 can be made integrally with the material of the venting device 1, in particular integrally with the lower wall 8.

Figure 3:
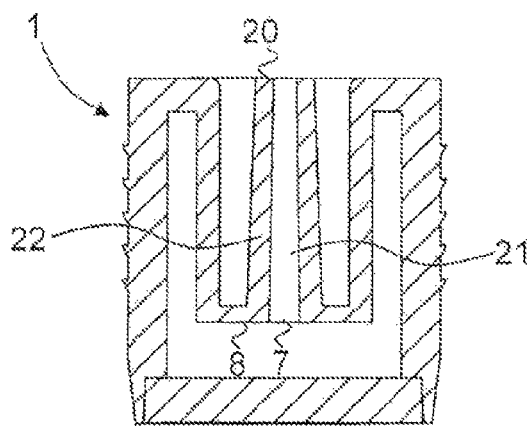

The dimension of the outer nozzle-like extension 20 in the longitudinal direction L can be chosen differently. For example, the length of the outer nozzle-like extension 20 can be about half of the length of the hollow chamber 16, as shown in FIG. 2, or it can extend about the full length of the hollow chamber 16 up to the upper side of the venting device 1, as shown in FIG. 3. Any other length can also be chosen.

Figure 4:
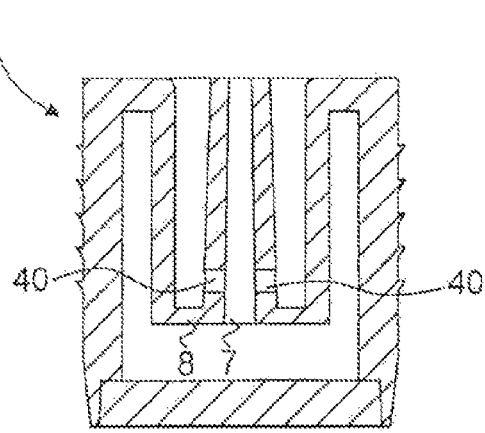

FIG. 4 shows another embodiment of the outer nozzle-like extension 20 having additional openings 40 which are located within the sidewall 22 of the outer nozzle-like extension 20.

FIG. 5 shows an embodiment of the venting device 1 having an inner nozzle-like extension 50 which is located on the lower wall 8 in which the first communication opening 7 is located. The inner nozzle-like extension 50 extends into the explosion chamber 5, 6. The inner nozzle-like extension 50 comprises an interior channel 51 which passes into the first communication opening 7. An outer wall 52 of the inner nozzle-like extension 50 can be made integrally with the material of the venting device 1 in particular integrally with the lower wall 8.

The different embodiments having either an outer nozzle-like extension 20 or an inner nozzle-like extension 50 can be combined, for example as shown in FIG. 6. The embodiment of the venting device 1 shown in FIG. 6 comprises both an outer nozzle-like extension 20 and an inner nozzle-like extension 50.

FIG. 7 depicts another embodiment of the venting device having an outer nozzle-like extension 20. Within the sidewall 22 of the outer nozzle-like extension 20 are additional openings 40, as already described in connection with FIG. 4. Contrary to FIG. 4, the openings 40 are closer to the lower wall 8 and merge into cut-outs 70 in the lower wall 8. FIG. 8 shows another sectional view with a sectional plane indicated by the arrows in FIG. 7. The embodiment of the venting device of FIGS. 7, 8 has the advantage that the additional openings 40 can be manufactured more efficiently by producing the cut-outs 70 with a tool from the lower side of the venting device 1, before the flame arrester element 4 is inserted.

FIG. 9 depicts an electrochemical battery 90. The battery 90 comprises a housing having a lower housing part 93 and a top cover part 92. The lower housing part 93 is equipped with the electrode plates and electrochemical substances of the battery 90. Then, the top cover part 92 is placed on the lower housing part 93 and fixed on the lower housing part 93, e.g. by transmission laser welding of the plastic material of the top cover part 92 and the lower housing part 93. The battery 90 comprises to pole bolts 94 extending through the top cover part 92. On a side of the top cover part 92 a vent opening 91 is located. A venting device 1 can be plugged into the vent opening 91 and is secured within the vent opening 91, e.g. by the barb-shaped extensions 12 of the venting device 1.

Figure 10:
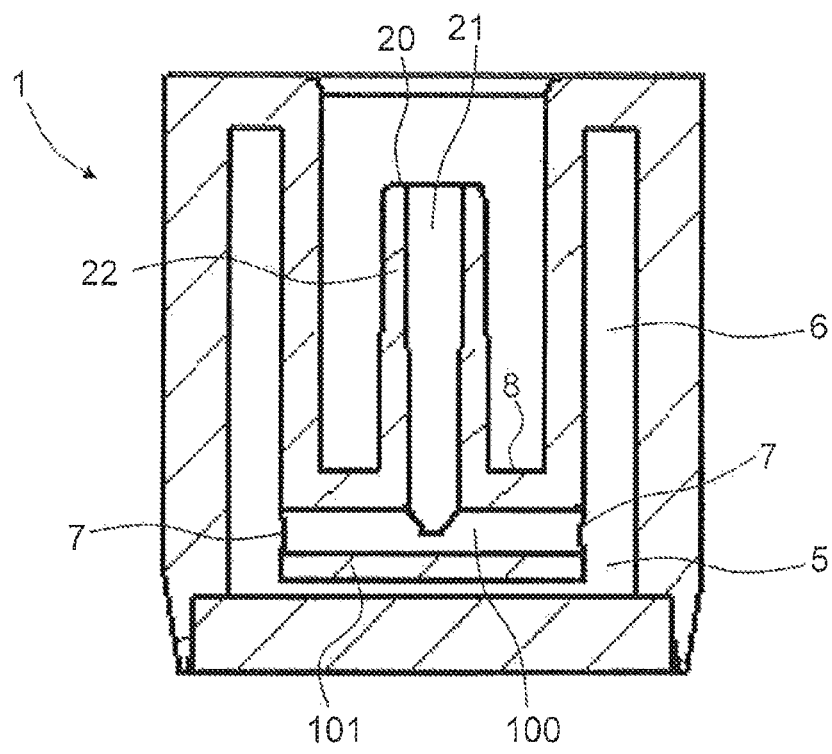

FIG. 10 shows an embodiment of the venting device 1 where the interior channel 21 of the outer nozzle-like extension 20 passes over, through the first communication opening 7, into a continuation channel 100 which extends in a transversal direction in relation to the longitudinal axis L of the venting device 1. The continuation channel 100 is limited by the lower wall 8 and an additional wall 101.

Figure 11:
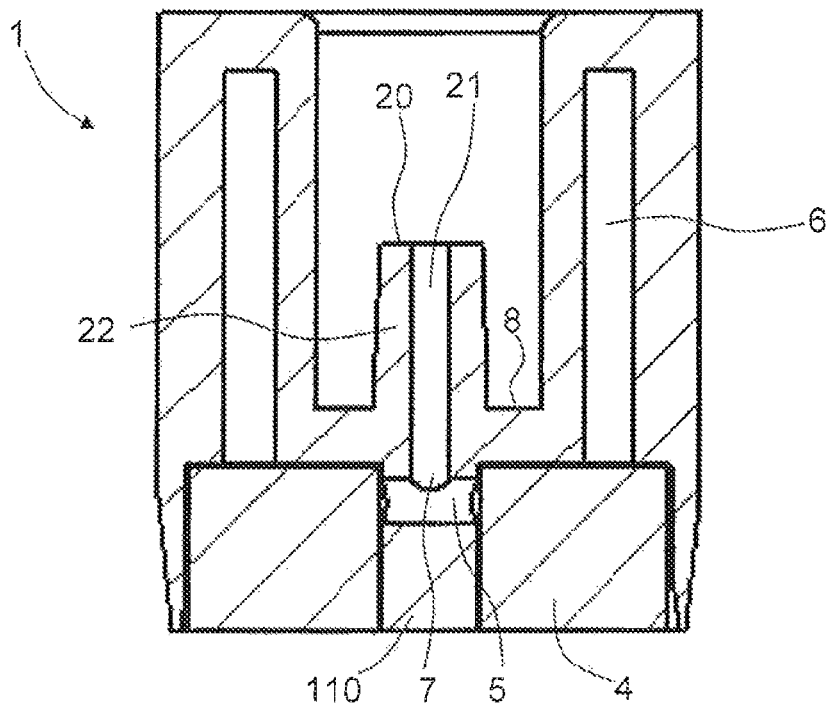

FIG. 11 depicts an embodiment of the venting device 1 where the flame arrester element 4 has a central clearance which establishes a first section 5 of the explosion chamber 5, 6. The central clearance is closed by a closing element 110 which delimits the first section 5 of the explosion chamber 5, 6 in the bottom direction. The closing element 110 can be made of a plastic material, e.g. the same material as used for the walls of the venting device 1, or of a flame retardant material.

Figure 12:
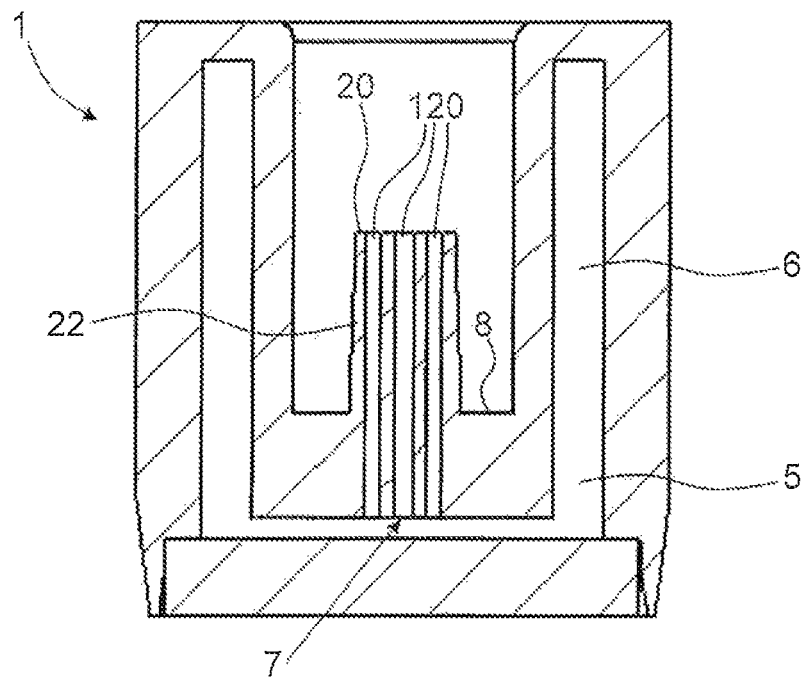

FIG. 12 depicts an embodiment of the venting device 1 having an outer nozzle-like extension 20 which comprises a plurality of relatively small degassing channels 120 in parallel. The degassing channels 120 merge into small openings facing the flame arrester element 4. The small openings form the first communication opening 7.

Figure 13:
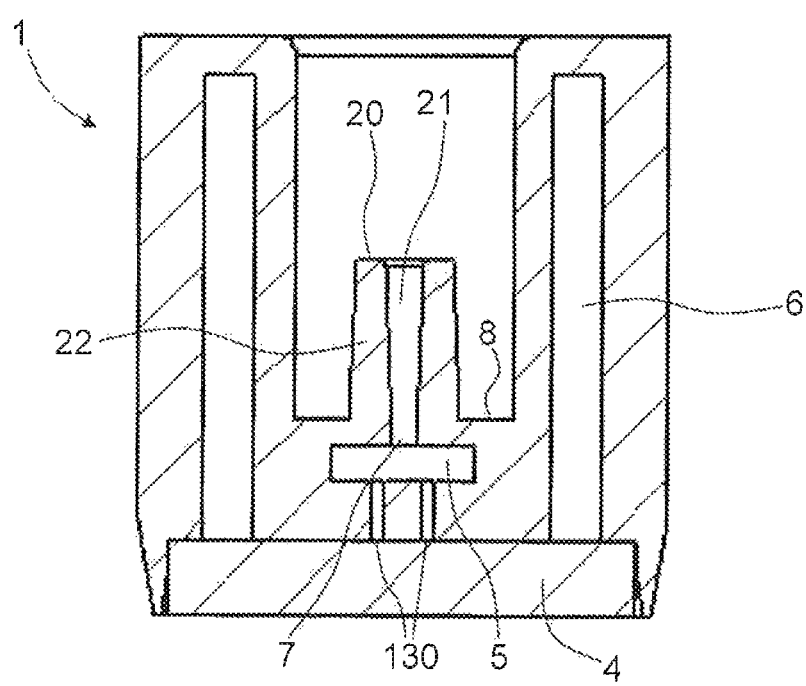

FIG. 13 depicts an embodiment of the venting device 1 comprising again the outer nozzle-like extension 20. The interior channel 21 of the outer nozzle-like extension 20 passes over via the first communication opening 7 into the first section 5 of the explosion chamber 5, 6. On the bottom side of the first section of the explosion chamber 5, 6 a number of small channels 130 is located which connect the first section 5 with the flame arrester element 4. The channels 130 form a second communication opening for communication between the first section 5 of the explosion chamber 5, 6 and the flame arrester element 4.

Figure 14:
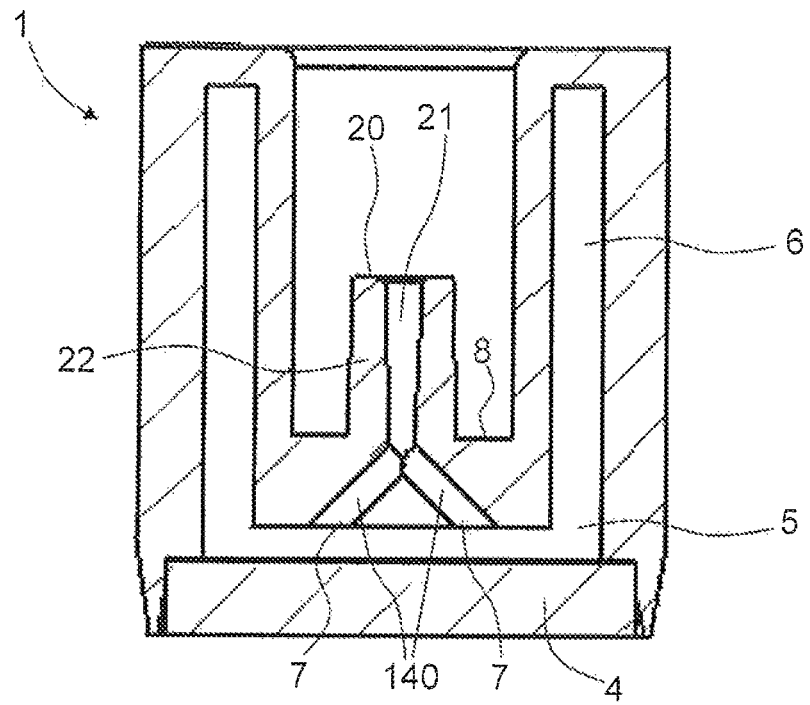

FIG. 14 depicts an embodiment of the venting device 1 comprising again the outer nozzle-like extension 20. The interior channel 21 of the outer nozzle-like extension 20 merges into continuation channels 140 which extend in a diagonal direction in relation to the longitudinal axis L of the venting device 1. The continuation channels 140 end in a number of openings forming the first communication opening 7.

Figure 15:
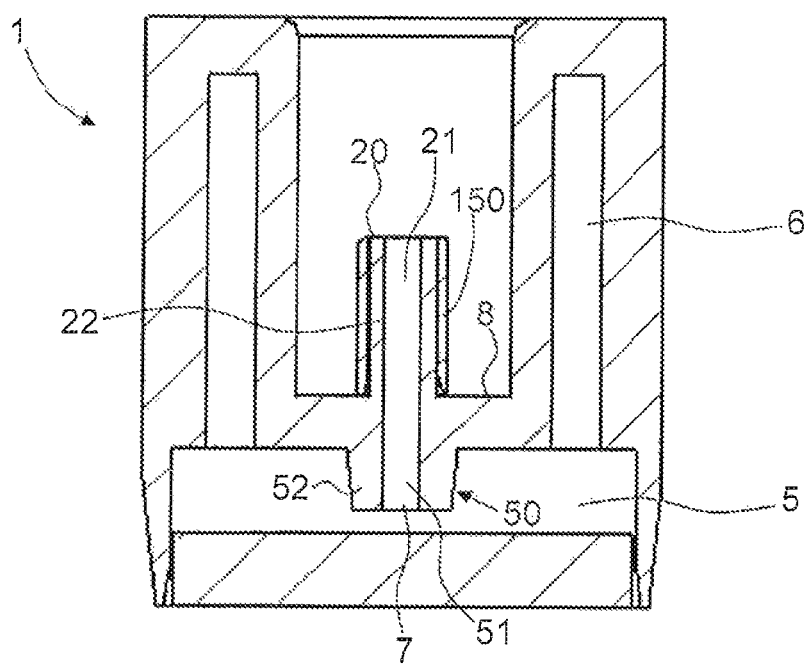

FIG. 15 depicts an embodiment of the venting device 1 comprising an outer nozzle-like extension 20 and an inner nozzle-like extension 50. The outer nozzle-like extension 20 comprises on the outer circumference of the sidewall 22 a threaded portion 150. Further, the second section 6 of the explosion chamber 5, 6 is made in the form of single drilled holes which are drilled into the material of the venting device 1 from the lower side of the venting device 1 before the flame arrester element 4 is inserted.

SUMMARY

The invention relates to a venting device (1) for an electrochemical battery (90) comprising:
a) the venting device (1) comprises at least one inlet opening (2) for receiving gases venting from the battery (90), the inlet opening being arranged for connection to a degassing opening (91) of the electrochemical battery (90),
b) the venting device (1) comprises at least one outlet opening (3) for venting the gases received from the battery (90), the outlet opening (3) being directed to the ambience of the battery (90),
c) the venting device (1) comprises at least one flame arrester element (4), the flame arrester element (4) being arranged to prohibit a breakthrough of flames into the interior of the battery (90),
d) the inlet opening (2) is in communication with the outlet opening (3) via the flame arrester element (4),
e) an explosion chamber (5, 6) is located within the venting device (1) on the side of the flame arrester element (4) which is directed to the outlet opening (3),
f) the explosion chamber (5, 6) is arranged for developing and temporarily storing an explosive mixture of the gases received from the battery (90) and oxygen from ambient air, which explodes in case a flame occurs within the explosion chamber (5, 6), thereby blowing off the flame.

The invention further relates to a battery with such a venting device.

The invention claimed is:
1. Venting device (1) for an electrochemical battery (90) comprising:
a) the venting device (1) comprises at least one inlet opening (2) for receiving gases venting from the battery (90), the inlet opening being arranged for connection to a degassing opening (91) of the electrochemical battery (90),
b) the venting device (1) comprises at least one outlet opening (3) for venting the gases received from the battery (90), the outlet opening (3) being directed to an ambience of the battery (90),
c) the venting device (1) comprises at least one flame arrester element (4), the flame arrester element (4) being arranged to prohibit a breakthrough of flames into the interior of the battery (90),
d) the inlet opening (2) is in communication with the outlet opening (3) via the flame arrester element (4), characterized by:
e) an explosion chamber (5, 6) which is located within the venting device (1) on a side of the flame arrester element (4) which is directed to the outlet opening (3),
f) the explosion chamber (5, 6) is arranged for developing and temporarily storing an explosive mixture of the gases received from the battery (90) and oxygen from ambient air, which explodes in case a flame occurs within the explosion chamber (5, 6), thereby blowing off the flame, wherein the flame arrester element (4) is or comprises an ignition protection frit made of flame retardant material, and wherein said flame arrester element (4) is arranged in a flow section between the electrochemical battery (90) and an interior of the explosion chamber (5, 6),
wherein the outlet opening (3) is in communication with the explosion chamber (5, 6) via at least one first communication opening (7) which is located with a wall (8, 9, 10, 11) surrounding the explosion chamber (5, 6) at least partially, and
wherein the explosion chamber (5, 6) is in communication with the flame arrester element (4) via a second communication opening (130), the cross section of the second communication opening (130) being small compared to the cross section of the explosion chamber (5, 6).

2. The venting device of claim 1, wherein the first communication opening (7) has a limited cross section which ensures that a flame occurring on the flame arrester element (4) within the explosion chamber (5, 6) is extinguished through the explosion within the explosion chamber (5, 6).

3. The venting device of claim 1, wherein a distance (b) between the wall (8) in which the first communication opening (7) is located and the flame arrester element (4) is dimensioned such that a flame occurring on the flame arrester element (4) within the explosion chamber (5, 6) is extinguished through the explosion within the explosion chamber (5, 6).

4. The venting device of claim 1, wherein the explosion chamber (5, 6) comprises a first chamber section (5) which is cylindrical, the first chamber section (5) being located between the flame arrester element (4) and the wall (8) in which the first communication opening (7) is located, and wherein the explosion chamber (5, 6) comprises a second chamber section (6) which is ring-shaped, the second chamber section (6) being located adjacent the first chamber section (5) on a side of the first chamber section (5) facing away from the flame arrester element (4).

5. The venting device of claim 1, wherein the first communication opening (7) passes into an outer nozzle-like extension (20), the outer nozzle-like extension (20) being located on the wall (8) in which the first communication opening (7) is located, but outside the explosion chamber (5, 6).

6. The venting device of claim 5, wherein the outer nozzle-like extension (20) comprises one or more additional openings (40) which are located within a side wall (22) of the outer nozzle-like extension (20).

7. The venting device of claim 5, wherein the outer nozzle-like extension (20) extends into a hollow chamber (16) of the venting device (1) which is in communication with the ambience of the battery (90), wherein the outer nozzle-like extension (20) forms a hose connector.

8. The venting device of claim 1, wherein the first communication opening (7) passes into an inner nozzle-like extension (50), which is located on the wall (8) in which the first communication opening (7) is located, whereby the inner nozzle-like extension (50) is located within the explosion chamber (5, 6).

9. The venting device of claim 1, wherein the venting device comprises a sleeve of flame retardant material which surrounds the first communication opening (7) and/or an inner nozzle-like extension (50).

10. The venting device of claim 1, wherein the venting device (1) has a generally circular cross section, the explosion chamber (5, 6) has a generally circular cross section and is located concentrically within the venting device (1).

11. The venting device of claim 10, wherein the outlet opening (3) is in communication with the explosion chamber (5, 6) via at least one first communication opening (7) which is located within a wall (8, 9, 10, 11) surrounding the explosion chamber (5, 6) at least partially, the first communication opening (7) being located concentrically within the explosion chamber (5, 6).

12. The venting device of claim 1, wherein the venting device (1) comprises a receiving area for receiving of the flame arrester element (4), the receiving area being composed of a wall material of the venting device (1), wherein the receiving area comprises a step or shoulder (14) in which the flame arrester element (4) can be inserted.

13. The venting device of claim 1, wherein the explosion chamber (5, 6) passes via the first communication opening (7) into at least one continuation channel which extends in a transversal or diagonal direction in relation to the longitudinal axis (L) of the venting device (1).

14. The venting device of claim 1, wherein the cross section of the first communication opening (7) is small in comparison to the cross section of the explosion chamber (5, 6).

15. The venting device of claim 1, wherein the first and/or the second communication opening (7) comprises more than one separate opening or channel (120, 130) located side-by-side, which are each providing degassing channels in parallel.

16. The venting device of claim 1, wherein the venting device (1) is a plug, which is arranged to be plugged into the degassing opening (91) of the electrochemical battery (90).

17. The venting device of claim 1, wherein the flame arrester element (4) is mounted on the housing material of the venting device (1), wherein the explosion chamber (5, 6) is delimited by the housing material of the venting device (1) and the flame arrester element (4).

18. The venting device of claim 1, wherein a dimension of the explosion chamber (5, 6) in a longitudinal direction (L) of the venting device is larger than the length of the first communication opening (7).

19. The venting device of claim 1, wherein a dimension of the explosion chamber (5, 6) in a longitudinal direction (L) of the venting device (1) completely or partially overlaps with the longitudinal dimension of the first communication opening (7).

20. The venting device of claim 1, wherein the flame arrester element (4) comprises a central clearance, the explosion chamber (5, 6) being at least partially located within the central clearance.

21. The venting device of claim 1, wherein the cross section of the first communication opening (7) divided by the distance (b) between the wall (8) in which the first communication opening (7) is located and the flame arrester element (4) is less than 12 mm.

22. The venting device of claim 1, wherein the volume of the explosion chamber (5, 6) divided by the cross section of the first communication opening (7) is larger than 200 mm.

23. The venting device of claim 1, wherein the volume of the explosion chamber (5, 6) divided by the distance (b) between the wall (8) in which the first communication opening (7) is located and the flame arrester element (4) is smaller than 2,200 mm$^2$.

24. An electrochemical battery (90) with the venting device (1) of claim 1.

25. The venting device of claim 1, wherein the cross section of the first communication opening (7) divided by the distance (b) between the wail (8) in which the first communication opening (7) is located and the flame arrester element (4) is less than 3 mm.

26. The venting device of claim 1, wherein the cross section of the first communication opening (7) divided by the distance (b) between the wail (8) in which the first communication opening (7) is located and the flame arrester element (4) is less than 0.6 mm.

27. The venting device of claim 1, wherein the volume of the explosion chamber (5, 6) divided by the cross section of the first communication opening (7) is larger than 500 mm.

28. The venting device of claim 1, wherein the volume of the explosion chamber (5, 6) divided by the cross section of the first communication opening (7) is larger than 1,000 mm.

29. The venting device of claim 1, wherein the volume of the explosion chamber (5, 6) divided by the distance (b) between the wail (8) in which the first communication opening (7) is located and the flame arrester element (4) is smaller than 1,200 mm$^2$.

30. The venting device of claim 1, wherein the volume of the explosion chamber (5, 6) divided by the distance (b) between the wail (8) in which the first communication opening (7) is located and the flame arrester element (4) is smaller than 600 mm$^2$.

* * * * *

UNITED STATES PATENT AND TRADEMARK OFFICE
CERTIFICATE OF CORRECTION

PATENT NO.        : 9,508,972 B2  
APPLICATION NO.   : 14/382207  
DATED             : November 29, 2016  
INVENTOR(S)       : Koch et al.

Page 1 of 1

It is certified that error appears in the above-identified patent and that said Letters Patent is hereby corrected as shown below:

1. In Column 3, Line 40, delete "ore more" and insert -- or more --, therefor.

2. In Column 8, Line 62, delete "section" and insert -- section 5 --, therefor.

3. In Column 9, Line 50, in Claim 1, delete "Venting" and insert -- A venting --, therefor.

4. In Column 12, Line 26, in Claim 25, delete "wail (8)" and insert -- wall (8) --, therefor.

5. In Column 12, Line 31, in Claim 26, delete "wail (8)" and insert -- wall (8) --, therefor.

6. In Column 12, Line 42, in Claim 29, delete "wail (8)" and insert -- wall (8) --, therefor.

7. In Column 12, Line 47, in Claim 30, delete "wail (8)" and insert -- wall (8) --, therefor.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*